United States Patent [19]

Doorakian

[11] 3,843,614

[45] Oct. 22, 1974

[54] AROMATIC POLYSULFIDE POLYMER

[75] Inventor: George A. Doorakian, Waltham, Mass.

[73] Assignee: The Dow Chemical Company, Midland, Mich.

[22] Filed: Aug. 22, 1973

[21] Appl. No.: 390,452

[52] U.S. Cl.................. 260/79, 260/47 R, 260/79.1
[51] Int. Cl............................................. C08g 23/00
[58] Field of Search...... 260/79, 79.1, 47 R, 79.3 M

[56] References Cited
UNITED STATES PATENTS

| | | | |
|---|---|---|---|
| 2,538,941 | 1/1951 | Macallum | 260/79.1 |
| 2,986,582 | 5/1961 | Martin et al. | 260/79.1 |
| 3,396,110 | 8/1969 | Hill, Jr. et al. | 260/79.1 |
| 3,719,645 | 3/1973 | Hiatt | 260/79 |

*Primary Examiner*—Melvyn I. Marquis
*Attorney, Agent, or Firm*—David H. Thurston; Glwynn R. Baker

[57] ABSTRACT

Polymeric aromatic polysulfides are made by reacting an aromatic disulfonic acid or similar difunctional aromatic oxygenated sulfur compound with an alkali metal polysulfide and hydrogen at elevated temperature and pressure in the presence of a sulfactive hydrogenation catalyst. The thermoplastic polymers thereby obtained are useful as sealants, molding compositions, and the like.

7 Claims, No Drawings

AROMATIC POLYSULFIDE POLYMER

BACKGROUND OF THE INVENTION

The present invention relates to organic polysulfide polymers and to a process for making them. It relates more particularly to such polymers wherein the organic portion is a divalent aromatic moiety.

Aliphatic polysulfide polymers of the type made by reacting sodium polysulfide with a reactive halide such as ethylene dichloride are well known. However, corresponding aromatic polymers cannot be made in this way because of the generally unreactive character of halogen attached to an aromatic ring.

SUMMARY OF THE INVENTION

It has been found that such aromatic polysulfide polymers can be made by a relatively indirect method comprising reacting an aromatic disulfonic acid, an aromatic disulfinic acid, a thio analog thereof, or a compound hydrolyzable to one of these with at least two moles of an alkali metal polysulfide and hydrogenating the reaction mixture in the presence of a sulfactive hydrogenation catalyst and in a polar solvent reaction medium at about 100°–300°C. under superatmospheric pressure. Under these conditions, the aromatic oxygenated sulfur compound is converted to the polysulfide polymer with a polymer yield of better than 90 percent.

DETAILED DESCRIPTION

The polysulfide polymer is composed substantially of linear molecules of moderate molecular weight, usually of the order of about 2,500–10,000. These polymer molecules consist essentially of repeating units of the structure

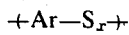

$$+Ar-S_x+$$

wherein Ar is a divalent aromatic radical and $x$ is a number from 2 to about 5, depending upon the amount of sulfur used in the preparation. For example, a preferred mode comprises reacting aqueous $Na_2S$ with one equivalent of sulfur to make sodium disulfide, than reacting this solution with the aromatic oxygenated sulfur compound in the presence of hydrogen and a catalyst as defined to obtain a disulfide polymer wherein $x = 2$. A more flexible or rubbery polymer is obtained by melting the disulfide polymer mixed with added sulfur to obtain a product wherein x has an average value of 3, 3.5, or more as desired. Alternatively, polymers where $x$ has a value greater than 2 can be made by initially reacting more sulfur with the sodium monosulfide solution to obtain a corresponding sodium polysulfide for use in the polymer forming reaction.

The hydrogenation-polysulfide reaction is applicable generally to aromatic sulfonic acids, aromatic sulfinic acids, and compounds hydrolyzable to these acids, for example, their salts, esters, amides, anhydrides, and acid halides. The reaction is also applicable to the thio analogs of these compounds where one or more oxygen atoms has been replaced by sulfur. Thus, the corresponding aromatic thiosulfonic acids, thiosulfinic acids, and their salts, esters, amides, anhydrides, and acid chlorides are also suitable starting materials.

The divalent aromatic radical represented by Ar in the above formula can be the residue of any aromatic disulfonic acid or other such compound as defined above wherein the aromatic nucleus is unreactive, i.e., is not decomposed in the polymer forming reaction.

Thus, Ar can be phenylene, naphthylene, biphenylene, lower alkylidenediphenylene, for example, methylenediphenylene and isopropylidenediphenylene, oxydiphenylene, iminodiphenylene, carbonyldiphenylene (from a benzophenonedisulfonic acid), and divalent aromatic heterocyclic residues such as those of quinoline, pyridine, indole, phenoxathiin, phenothiazine, and the like. These radicals having one to two inert substituents such as lower alkyl, lower alkoxy, and halogen, particularly chlorine and bromine, are also included. Ar preferably represents benzenoid radicals such as phenylene, tolylene, methylenebis(chlorophenylene), oxydiphenylene, isopropylidenediphenylene, and methylbiphenylene. Polymers wherein Ar is oxydiphenylene are of particular interest. These have alternating oxygen and polysulfide linkages between the benzene rings in the polymer molecule which provide high thermal and chemical stability as well as resistance to highly polar solvents.

These polymers generally are useful as sealing compounds, chemically resistant coatings, and molding compositions for making gaskets and the like.

Catalysts useful in the process are the sulfides and polysulfides of metals active as hydrogenation catalysts such as iron, nickel, cobalt, copper, molybdenum and tungsten. These can be used as such or formed in situ from the finely divided metal. Sulfides of the iron group of metals are of particular interest. All of these are defined in the art and are referred to herein as sulfactive hydrogenation catalysts. Any significant proportion of catalyst is effective, but preferred catalyst concentrations are 0.5–15 percent based on the weight of aromatic compound.

Sodium polysulfide is the preferred polysulfide reactant but other alkali metal polysulfides such as lithium polysulfide and potassium polysulfide work as well. An equivalent quantity of disulfide is required to complete the polymer formation reaction, that is, two moles of disulfide per mole of aromatic disulfonic acid or other such aromatic sulfur compound as previously defined. Preferably about 2–3 moles of disulfide is employed. More can be used but offers no advantage.

The hydrogenation reaction is carried out in a polar solvent, preferably water or aqueous lower alkanol. In this way, the polymeric polysulfide is precipitated and effectively removed from the reacting mixture as it forms while the other reactants remain in solution. Only enough solvent is needed to keep at least a substantial portion of the aromatic starting compound and the alkali metal polysulfide in solution under the reaction conditions. Preferably, water is the solvent and is used in sufficient amount to dissolve both the aromatic and polysulfide reactants.

The process of the invention is operable at temperatures in the range of about 100°–300°C. and a preferred temperature range is 150°–250°C. Any substantially superatmospheric pressure of hydrogen is operable and preferred process pressures are in the range of about 100–5,000 p.s.i.g.

EXAMPLE 1

Twenty grams of finely divided sulfur was added with stirring to a solution of 144 g. $Na_2S \cdot 9H_2O$ in 600 ml. of water. After the sulfur had dissolved to form a dark yellow solution, 110.4 g. of 4,4′-oxydibenzenesulfonyl chloride was added rapidly with vigorous stirring, the resulting reaction causing the temperature of the solution to rise to 60°C. After stirring for 30 minutes, the yellow solution produced had cooled to room temperature and it was put in a stainless steel pressure reactor with 3 g. of powdered iron. The reactor was then evacuated, pressurized with hydrogen to 700 p.s.i.g., and heated in 45 minutes to 190°C. while rocking to provide agitation. The reactor was maintained at 190°C. for 4 hours, then was cooled and purged with nitrogen. The solids were filtered from the contents and the polymer product was separated from the catalyst by dissolving it in tetrahydrofuran and pouring the solution into excess methyl alcohol to precipitate the polymer. The dried product was 63 g. of a white solid melting at 98°–110°C., soluble in tetrahydrofuran and methylene chloride, insoluble in water and methyl alcohol. Its structure was confirmed as the polymeric disulfide by nuclear magnetic resonance spectrometry and elemental analysis. Vapor pressure osmometry of the tetrahydrofuran solution indicated an average molecular weight of about 3,350. It could be drawn as a fiber from the melted material.

EXAMPLE 2

A sample of the polymer product of Example 1 was intimately mixed with one equivalent weight of sulfur and heated for 30 minutes at 120°C. to form a yellow, slightly rubbery polysulfide polymer, melting point 100°–118°C. Fibers could also be drawn from this material when molten.

A polymer similar to the product of Example 2 is obtained when the procedure of Example 1 is repeated except for using twice the quantity of sulfur, thereby making an initial solution of sodium trisulfide instead of the disulfide shown.

Polysulfide polymers analogous to the products described in the above examples are obtained when the starting aromatic compound is benzenedisulfonic acid, the sodium salt of 1,7-naphthalenedisulfinic acid, 4,4'-methylenedibenzenesulfonyl chloride, 3,3'-carbonylbis-(6-chlorobenzenesulfonic acid), 4,4'-oxybis(N-methylbenzenesulfonamide), 1,5-naphthalenedisulfonyl chloride, 4,4'-iminodibenzenesulfonyl chloride, and 4,4'-methylenedi-1-naphthalenesulfonic acid. Other such aromatic disulfonic acids, disulfinic acids, and their derivatives of the thio analogs thereof as previously defined react in the process to give similar polymeric polysulfides.

I claim:

1. A process for making an aromatic polysulfide polymer which comprises reacting an aromatic compound of the group consisting of an aromatic disulfonic acid, an aromatic disulfinic acid, a thio analog thereof, and a compound hydrolyzable thereto with at least two moles of an alkali metal polysulfide and hydrogenating the reaction mixture in the presence of a sulfactive hydrogenation catalyst and in a polar solvent reaction medium at about 100°–300°C. under superatmospheric pressure.

2. The process of claim 1 wherein the aromatic compound is oxydibenzenesulfonyl chloride and the alkali metal polysulfide is $Na_2S_2$.

3. An aromatic polysulfide polymer consisting essentially of repeating units having the formula

wherein Ar is an oxydiphenylene radical and $x$ is a number from 2 to about 5.

4. The polymer of claim 3 wherein Ar is a 4,4'-oxydiphenylene radical.

5. The polymer of claim 4 wherein $x = 2$.

6. The polymer of claim 4 wherein $x = 3$.

7. The process of claim 1 wherein the polar solvent is water.

* * * * *

PO-1050
(5/69)

UNITED STATES PATENT OFFICE
CERTIFICATE OF CORRECTION

Patent No. 3,843,614     Dated October 22, 1974

Inventor(s) George A. Doorakian

It is certified that error appears in the above-identified patent and that said Letters Patent are hereby corrected as shown below:

Col. 4, line 8, delete "of" and insert --or--

Signed and sealed this 1st day of April 1975.

(SEAL)
Attest:

RUTH C. MASON
Attesting Officer

C. MARSHALL DANN
Commissioner of Patents
and Trademarks